United States Patent [19]
Kemkemian et al.

[11] Patent Number: 5,963,163
[45] Date of Patent: Oct. 5, 1999

[54] METHOD AND DEVICE FOR FREQUENCY-MODULATED CONTINUOUS-WAVE RADAR DETECTION WITH REMOVAL OF AMBIGUITY BETWEEN DISTANCE AND SPEED

[75] Inventors: Stéphane Kemkemian, Paris; Philippe Lacomme, Igny, both of France

[73] Assignee: Thomson-CSF, Paris, France

[21] Appl. No.: 09/030,012

[22] Filed: Feb. 25, 1998

[30] Foreign Application Priority Data

Mar. 4, 1997 [FR] France ................................. 97 02546

[51] Int. Cl.⁶ ........................................................ G01S 13/42
[52] U.S. Cl. ........................ 342/109; 342/111; 342/112; 342/116; 342/127; 342/129
[58] Field of Search ................................. 342/109, 111, 342/112, 115, 116, 127, 128, 129, 130

[56] References Cited

U.S. PATENT DOCUMENTS

| | | | |
|---|---|---|---|
| 4,176,351 | 11/1979 | DeVita et al. | 342/111 |
| 4,297,703 | 10/1981 | Lacomme | 342/95 |
| 4,331,958 | 5/1982 | Lacomme | 342/152 |
| 4,388,622 | 6/1983 | Fletcher, Jr. | 342/112 |
| 4,727,375 | 2/1988 | Lacomme | 342/91 |
| 4,860,014 | 8/1989 | Shores et al. | 342/105 |
| 5,309,160 | 5/1994 | Powell et al. | 342/128 |
| 5,376,939 | 12/1994 | Urkowitz | 342/134 |
| 5,657,022 | 8/1997 | Van Etten et al. | 342/104 |

FOREIGN PATENT DOCUMENTS

| | | |
|---|---|---|
| 0 561 690 A1 | 9/1993 | European Pat. Off. |
| 0 730 166 A1 | 9/1996 | European Pat. Off. |
| WO 96/14590 | 5/1996 | WIPO |

*Primary Examiner*—John B. Sotomayor
*Attorney, Agent, or Firm*—Oblon, Spivak, McClelland, Maier & Neustadt, P.C.

[57] ABSTRACT

In a method and device for frequency-modulated continuous-wave radar detection with removal of ambiguity between the distance and the speed, the radar sends out at least alternately two parallel and discontinuous frequency modulation ramps that are slightly offset by a frequency variation ($\Delta F$), the frequency switching from one ramp to the other at the end of a given duration (Tf), the distance from a detected target being estimated as a function of the difference in phase ($\Delta\phi$) between a received signal ($S_1(t)$) corresponding to the first ramp and a received signal ($S_2(t)$) corresponding to the second ramp, the speed of the target being obtained from the estimated distance and the ambiguity straight line associated with the target. The disclosed method and device can be applied especially to radars for automobiles.

9 Claims, 5 Drawing Sheets

METHOD AND DEVICE FOR FREQUENCY-MODULATED CONTINUOUS-WAVE RADAR DETECTION WITH REMOVAL OF AMBIGUITY BETWEEN DISTANCE AND SPEED

BACKGROUND OF THE INVENTION

The present invention relates to a method and device for frequency-modulated continuous-wave radar detection with removal of ambiguity between distance and speed. It can be applied especially to radars for automobiles moving in a multiple-target environment, for example when the targets present are relatively grouped together.

There are known ways of fitting out automobiles with radars for road traffic control. These radars in particular carry out the functions of speed regulation or obstacle detection. A speed regulation radar for automobiles has the function in particular of detecting the distance and speed between a carrier vehicle and the vehicle preceding it, in order to enable the carrier vehicle to adjust its speed with respect to the preceding vehicle, in order to meet, for example, safety criteria. A radar of this kind moves essentially in a multiple-target environment. Furthermore, the targets that are present are relatively grouped together:

- either with respect to a certain speed with unspecified distances, especially when the target vehicles follow each other in a traffic queue or when the detected targets actually correspond to ground echoes;
- or with respect to a certain distance with various speeds, especially when one vehicle is being overtaken by another.

Since a simple version of a frequency-modulated continuous-wave radar, hereinafter called an FM-CW radar, consists of the linear frequency modulation of the continuous wave on a given waveband, there are known ways, if only one target can be illuminated at a given point in time, of removing the ambiguity between the distance and the speed by alternating frequency modulation ramps with opposite slopes. In certain multiple-target situations, a third frequency ramp is used, generally with a zero slope and then finally a fourth sequence may be necessary to remove the doubt.

This approach has major drawbacks, especially the following:

The sensitivity of the radar is reduced for two main reasons:
   the target observation time must be divided into three or four intervals of integration;
   the target must be detected at each of the sequences.
There may remain erroneous cases of removal of ambiguity. This actually creates "ghost" blips, all the more so as the frequency resolution is reduced by the distribution of the target observation time.

SUMMARY OF THE INVENTION

The aim of the invention in particular is to overcome the above-mentioned drawbacks by enabling the removal of the ambiguity between distance and speed in reducing the number of frequency ramps needed. To this end, an object of the invention is a method of frequency-modulated continuous-wave radar detection with removal of ambiguity between the distance and the speed, wherein the radar sends out at least alternately two parallel and discontinuous frequency modulation ramps that are slightly offset, the frequency being switched from one ramp to the other at the end of a given period, the distance from a detected target being estimated as a function of the difference in phase between a received signal corresponding to the first ramp and a received signal corresponding to the second ramp, the speed of the target being obtained from the estimated distance and the ambiguity straight line associated with the target.

An object of the invention is also a device for the implementation of the method.

The main advantages of the method are that it does not create any problem of erroneous association in a multiple-target context, enables high precision of measurement, can work on a wide range of applications, and is economical and simple to implement.

BRIEF DESCRIPTION OF THE DRAWINGS

Other features and advantages of the invention shall appear from the following description made with reference to the appended drawings, of which.

MORE DETAILED DESCRIPTION

Figure 1:
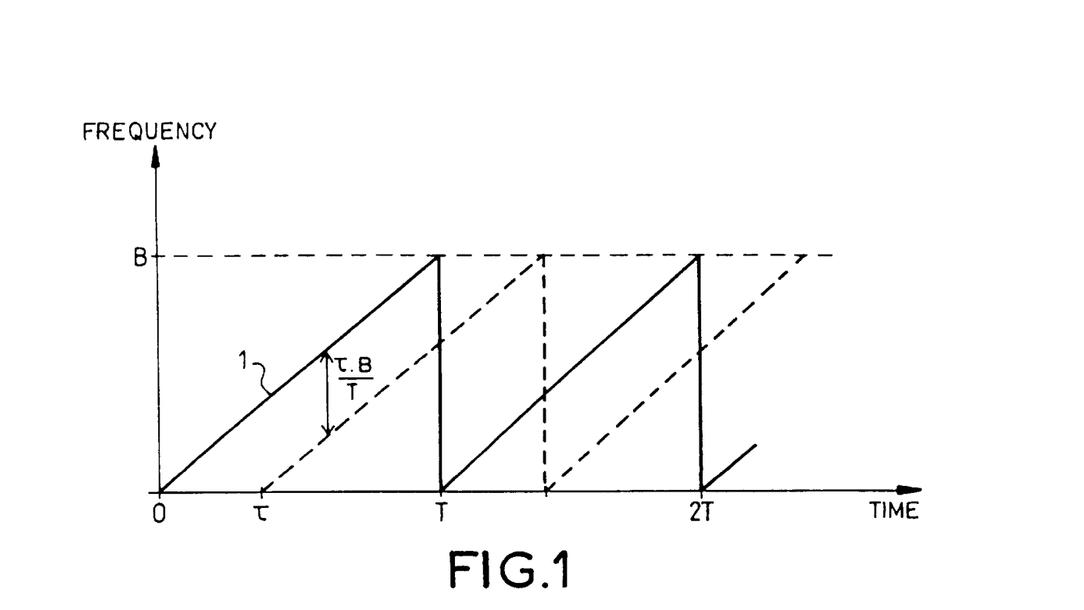
FIG. 1 illustrates the principle of operation of an FM-CW radar with linear modulation.

FIG. 1 illustrates the principle of operation of an FM-CW radar by an example using linear frequency modulation 1 in a given band B. This modulation is represented by a ramp with a given slope that repeats itself in a period T throughout the frequency band B. The principle of the FM-CW radar, in its simplest version, consists of the linear frequency modulation, on a given band B, of a continuous wave coming from a signal generator. This wave is used at the same time for transmission and as a local oscillator signal at reception. The beat signal received is, in a time interval smaller than or equal to the period T of the modulation 1, a sine signal with a frequency referenced f. In the case of an unmoving target located at a distance D from the radar, the beat frequency f is given by the following relationship:

$$f = -B\frac{\tau}{T} = \frac{-2DB}{CT} \quad (1)$$

where B and T having been defined previously, C represents the velocity of light and τ the duration of to-and-fro propagation from the target to the radar.

If the target is moved at a relative speed $V_r$ with respect to the radar, the previous frequency, given the Doppler effect, becomes:

$$f = \frac{-2DB}{CT} + \frac{2Vr}{\lambda} \qquad (2)$$

where $\lambda$ represents the wavelength of the signal transmitted by the radar, this signal having a frequency of about 76 GHz especially in the case of an automobile application.

The spectral analysis of the beat signal on the maximum duration corresponding to the above-mentioned period T is used to obtain a frequency resolution $\delta f=1/T$. If the relative speed $V_r$ of the target is known beforehand, the relationship (2) then gives the distance from the target without ambiguity, with a distance resolution defined by the following relationship:

$$\delta D = \frac{C}{2B} \qquad (3)$$

Conversely, if the distance D is known, the speed is obtained without ambiguity according to the following relationship:

$$\delta V_r = \frac{\lambda}{2T} \qquad (4)$$

In general, there is ambiguity between distance and speed. A beat signal at the frequency f may be created by any target whose distance D and speed $V_r$ verify the following relationship:

$$f - \frac{\delta f}{2} < \frac{-2DB}{CT} + \frac{2V_r}{\lambda} < f + \frac{\delta f}{2} \qquad (5)$$

In a Distance-Speed plane, this locus of ambiguity is depicted by a straight line. Should only one target be illuminated at a given point in time, the removal of ambiguity between the distance and the speed is achieved conventionally by the alternating of frequency modulation ramps having opposite slopes and by resolving the following system of equations:

$$\bullet \frac{-2DB}{CT} + \frac{2V_r}{\lambda} = f_1 \qquad (6)$$

$$\bullet \frac{+2DB}{CT} + \frac{2V_r}{\lambda} = f_2 \qquad (7)$$

where $f_1$ and $f_2$ represent the frequencies of the beat signals received.

Figure 2:
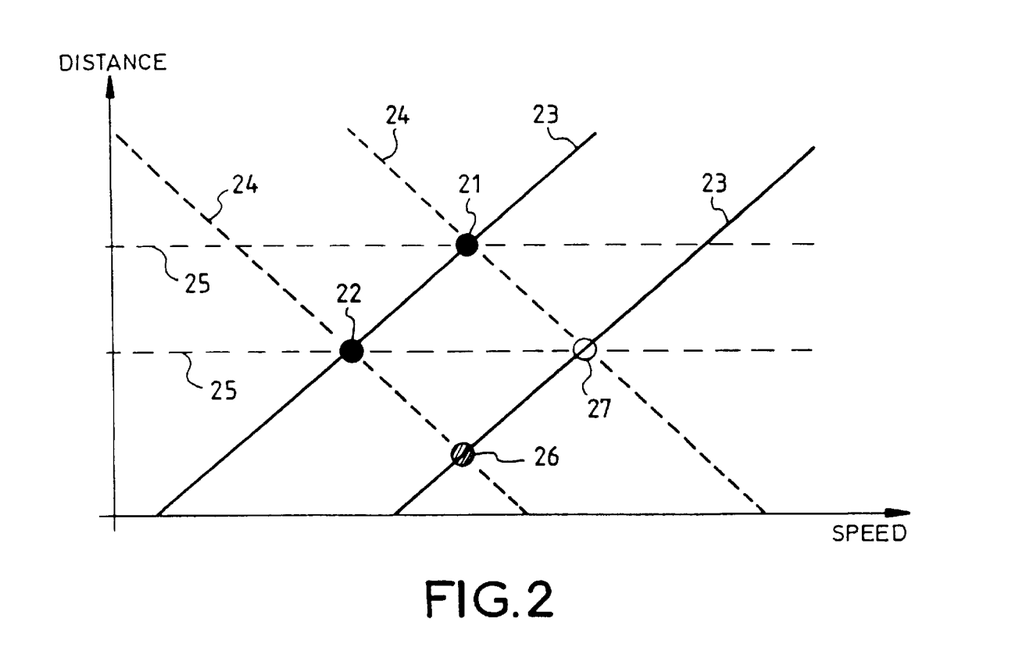
FIG. 2 gives a view, in the Distance-Speed plane, of an exemplary multiple target situation of the prior art.
Figure 3:
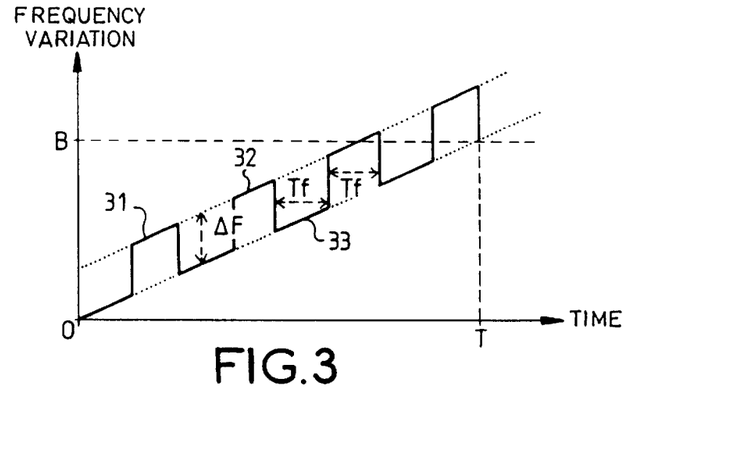
FIG. 3 illustrates the radar detection method according to the invention by a representation, in the Frequency-Time plane, of the transmitted frequency modulation.

The relationship (6) corresponds to an upward slope and the relationship (7) corresponds to a downward slope. When there is a number N of targets greater than or equal to two, the problem gets complicated for each ramp gives rise to N straight lines. There are consequently $N^2$ intersections, hence $N^2$ possible associations. The approach commonly used consists of the addition of a third ramp whose slope is generally chosen to be zero. FIG. 2 gives a view, in the Distance-Speed plane, of an exemplary multiple-target situation where this third ramp proves to be inadequate. The number of real targets here is equal for example to two, these targets verifying for example the system of equations of the relationships (6) and (7). The positions of the two targets in the above-mentioned plane are represented by two points of intersection 21, 22 whereas in all there are four possible intersections 21, 22, 26, 27. Indeed, these two points 21, 22 are at intersections of two straight lines 23 with upward slopes and two straight lines 24 with downward slopes. Straight lines 25 with a zero slope are used to remove ambiguity with a first intersection represented by a hatched dot 26 but cannot be used to remove ambiguity with another intersection represented by an blank dot 27. A known approach to remove this ambiguity then requires the use of a fourth sequence which, furthermore, is not obligatorily a frequency modulation ramp. This approach however has all the drawbacks referred to here above. A first drawback lies especially in the existence of a reduced sensitivity of the radar because, firstly, the observation time of the target must be divided into three or four integration intervals and, secondly, the target must be detected in each of the sequences. A second drawback furthermore lies in the fact that cases of erroneous removal of ambiguity may remain, all the more so as the frequency resolution is reduced by the division of the observation time of the targets FIG. 3 illustrates the method of radar detection according to the invention by a representation, in the Frequency-Time plane, of the modulation 31 of frequency transmitted. According to the invention, the radar makes alternate transmission, for a duration Tf, of two parallel and discontinuous frequency modulation ramps 32, 33 on a band B. These ramps are slightly offset by a frequency variation $\Delta F$. The frequency ½ Tf of switching from one ramp to the other determines the frequency ambiguity of the waveform.

Assuming that two samples, $S_1(t)$ and $S_2(t)$, are taken of the signal received from a target that are located, at the beginning of the time periods, at the distance D and have a relative speed $V_r$, then at an instant t the delay $\tau$ of propagation of the radar signals is given by the following relationship, the original point of the time periods being the beginning of the first ramp:

$$\tau = \frac{2(D - V_r t)}{C} \qquad (8)$$

The first signal $S_1(t)$ corresponding to the first ramp at the period of time t in a $k^{th}$ cycle of ramp-switching, that is $2kTf \leq t < (2k+1)Tf$;

and the second signal $S_2(t)$ corresponding to the second ramp at the time t+Tf, t still belonging to the $k^{th}$ switching cycle;

the instantaneous frequency and the value of the signal transmitted on the first ramp at the time t are then respectively given by the following relationships:

$$f_1(t) = F_0 + \frac{Bt}{T} \qquad (9)$$

$$S_{el}(t) = \mathrm{Exp}\left[2\pi j\left(F_0 t + \frac{Bt^2}{2T}\right) + \varphi_{k1}\right] \qquad (10)$$

the instantaneous frequency and the value of the signal sent on the second ramp at the time t+Tf are then respectively given by the following relationships:

$$f_2(t + Tf) = F_0 + \frac{Bt}{T} + \frac{BTf}{T} + \Delta F \qquad (11)$$

$$S_{el}(t + Tf) = \mathrm{Exp}\left[2\pi j\left(F_0 t + \frac{B(t+Tf)^2}{2T} + \Delta F(t + Tf)\right) + \varphi_{k2}\right] \qquad (12)$$

$F_0$ represents the basic frequency of the signals transmitted by the radar, in the absence of any modulation. As seen here above B represents the frequency excursion band, namely in fact the amplitude of the ramps, and $\phi_{k1}$ and $\phi_{k2}$ represent the phases at the outset of each switching cycle. $\phi_{k1}$ and $\phi_{k2}$ are indeterminate if the phase coherence is not ensured from cycle to cycle. With respect to the phase coherence, it must be noted that so long as the distance from the target is smaller than the distance of pseudo-ambiguity CT/2, the phase coherence is necessary only within a ramp interval with a duration equal to the repetition period T of the ramps. In particular, the phase at the beginning of each of these periods or intervals with a duration T may be any phase since the local oscillation signal at reception is identical to the one transmitted, except for a temporal shift and the Doppler effect. The coherence on several intervals of a ramp is necessary only if the distance from a target is greater than the previous pseudo-ambiguity.

Since a signal received at the instant t comes from a transmission at the instant t−τ, the beat signals $S_1(t)$ and $S_2(t)$ then verify the following relationships:

$$S_1(t) = S_{e1}(t - \tau) S_{e1}(t) \qquad (13)$$

$$S_2(t + Tf) = S_{e2}(t + Tf - \tau) S_{e2}(t + Tf) \qquad (14)$$

If τ<Tf, then the phase terms at the beginning get eliminated and we obtain:

$$S_1(t) = \mathrm{Exp}\left[ 2\pi j \left( -F_0 \tau + \frac{B\tau^2}{2T} - \frac{B t \tau}{T} \right) \right] \qquad (15)$$

$$S_2(t + Tf) = S_1(t) \mathrm{Exp}\left[ -2\pi j \left( \Delta F + B\frac{Tf}{T} \right) \tau \right] \qquad (16)$$

The differential phase $\Delta\phi = \phi[S_1(t)] - \phi[S_2(t+Tf)]$ is equal to:

$$\Delta\varphi = 4\pi\left( \Delta F + B\frac{Tf}{T} \right)\left( \frac{D - V_r t}{C} \right) \qquad (17)$$

The term proportional to the time $V_r t$ of the relationship (17) corresponds to the slight variation in distance from the target during the total time of the frequency ramp. It is generally negligible. Consequently, the differential phase $\Delta\phi$ between the two signals $S_1(t)$ and $S_2(t)$ is given approximately by the following relationship:

$$\Delta\varphi = 4\pi\left( \Delta F + B\frac{Tf}{T} \right)\left( \frac{D}{C} \right) \qquad (18)$$

The differential phase between the signals $S_1(t)$ and $S_2(t)$ is therefore practically independent of the speed of the target. It therefore enables a direct measurement of the distance from the target. The measurement of this differential phase therefore actually enables a pre-estimation of the distance D from the target to the radar defined by the following relationship:

$$D = \frac{\Delta\varphi}{4\pi} \times \frac{C}{\left( \Delta F + B\frac{Tf}{T} \right)} \qquad (19)$$

This measurement is ambiguous to within 2 π. This corresponds, if we take $\Delta\phi$ as being equal to 2 π, to an ambiguity distance of $D_{2\pi}$ defined according to the following relationship:

$$D_{2\pi} = \frac{C}{2\left( \Delta F + B\frac{Tf}{T} \right)} \qquad (20)$$

If R denotes the signal-to-noise ratios of $S_1(t)$ or $S_2(t)$ assumed to be of the same level, the differential phase measurement is assigned an error whose standard deviation $\sigma_\phi$ is approximately given by the following relationship:

$$\sigma_\varphi = \frac{1}{\sqrt{R}} \qquad (21)$$

The distance deduced from this differential phase measurement is thus assigned an error whose standard deviation is $\sigma_D = D_{2\pi} \sigma_\phi$, giving approximately:

$$\sigma_D = \frac{C}{4\pi\left( \Delta F + B\frac{Tf}{T} \right)\sqrt{R}} \qquad (22)$$

Generally $\Delta F$ is far greater than $$B\frac{Tf}{T},$$

whence:

$$\sigma_D = \frac{C}{4\pi \Delta F \sqrt{R}} \qquad (23)$$

To the extent possible, it is preferable to try and obtain a precision in the pre-estimation of the distance that is in the same range or even greater than that of the distance resolution given by the relationship (2), namely in such a way that:

$$R > \left( \frac{B}{2\pi \Delta F} \right)^2 \qquad (24)$$

Simultaneously, a standard processing operation performed by the FM-CW radar enables the extraction, for each target, of an ambiguity straight line in the Distance-Speed plane. If all the targets are located within the value of the ambiguity of the distance pre-estimation, namely in fact within the value of the ambiguity distance $D_{2\pi}$ defined here above, then it is enough to carry over the distance pre-estimation obtained by the differential phase measurement to the associated ambiguity straight line to remove the ambiguity between the distance and the speed, this being the case whatever the number of ambiguity straight lines, namely whatever the number of targets resolved. Indeed, each spectral line obtained after analysis of a beat signal corresponding to a detection induces an ambiguity straight line in the Distance-Speed plane and enables a differential phase measurement, the latter leading to the pre-estimation of distance. The association of a straight line and a differential phase measurement is therefore implicit.

Figure 4:
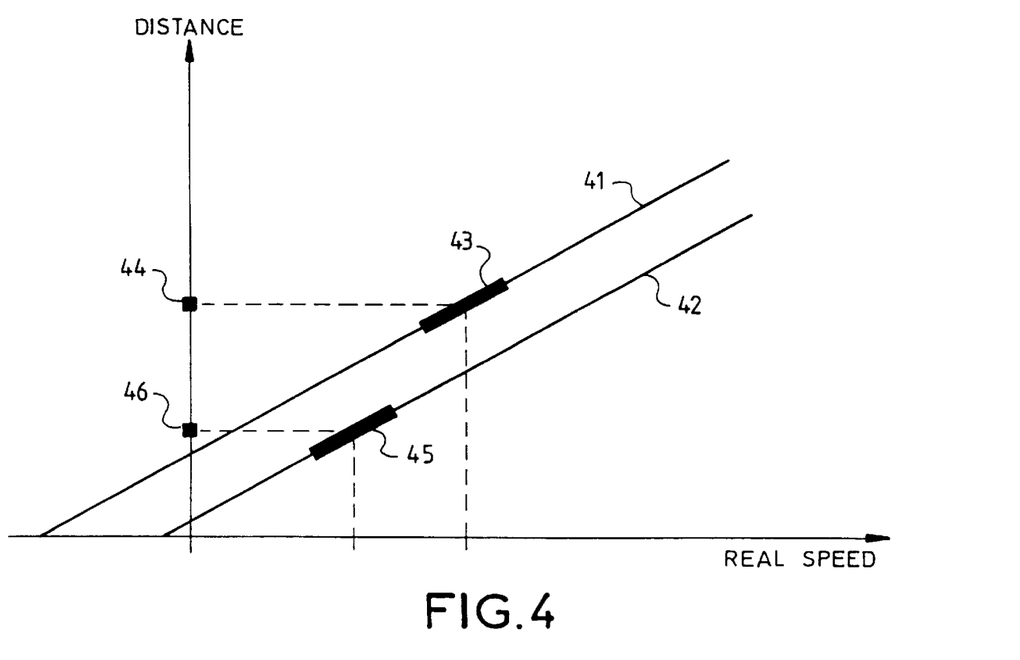
FIG. 4 illustrates the method according to the invention by a representation in the Distance-Speed plane.

FIG. 4 illustrates the previous principle of the method according to the invention. This figure shows a case of detection applied to two targets, for example those of FIG.

2. Radar processing has been used, in a first step, for the extraction in the Distance-Speed plane of a first ambiguity straight line 41 for a first target and a second ambiguity straight line 42 for a second target. The targets are assumed to be all located within the value of the ambiguity distance $D_{2\pi}$ defined here above. The pre-estimation of distance 44 obtained by the differential phase measurement makes it possible, in a second step, to remove the ambiguity between the distance and the speed on the ambiguity straight line 41. Similarly, the pre-estimation of distance 44 obtained by the differential phase measurement makes it possible, in this second step, to remove the ambiguity between the distance and the speed on the second ambiguity straight line 42. Zones of uncertainty of measurement 43, 45 located on the ambiguity straight lines and positioned around pre-estimations of distance remain on the ambiguity straight lines, giving an error $\sigma_{Vr}$ on the speed.

From the relationship (2), it therefore follows that the speed of a target is given by the following relationship which is the equation of the ambiguity straight line associated with the distance D:

$$V_r = \frac{\lambda}{2} f + \frac{BD\lambda}{CT} \quad (25)$$

By using the pseudo-resolutions in distance and speed obtained according to the relationship (3) and (4), D being the pre-estimated distance, we get:

$$V_r = \frac{\lambda}{2} f + D \frac{\delta Vr}{\delta D} \quad (26)$$

If targets can be found beyond the ambiguity distance $D_2$ $\pi$, it is necessary beforehand to remove the ambiguity of the pre-estimation before applying the steps described in relation to FIG. 4.

An FM-CW radar does not have any real resolution in the two dimensions of distance and speed. The precision in terms of distance is that of the pre-estimation of distance given by the relationship (23). The precision in terms of speed is deduced from the relationship (26). In the optimum case, where the noise on the pre-estimation of distance is zero, the precision in terms of speed is limited by the spectral resolution. In the other cases, the distance error $\sigma_D$ and the speed error $\sigma_{Vr}$ verify the following relationships:

$$\sigma_{Vr}^2 = \sigma_{0\_Vr}^2 + \left(\frac{\delta Vr}{\delta D}\right)^2 \sigma_D^2 \quad (27)$$

$\sigma_{0\_Vr}^2$ being the precision of speed limited only by the spectral resolution.

The relationship (27) can also be written as follows:

$$\sigma_{Vr}^2 = \sigma_{0\_Vr}^2 + \delta V_r^2 \frac{B^2}{(2\pi\Delta F)^2 R} \quad (28)$$

Figure 5:
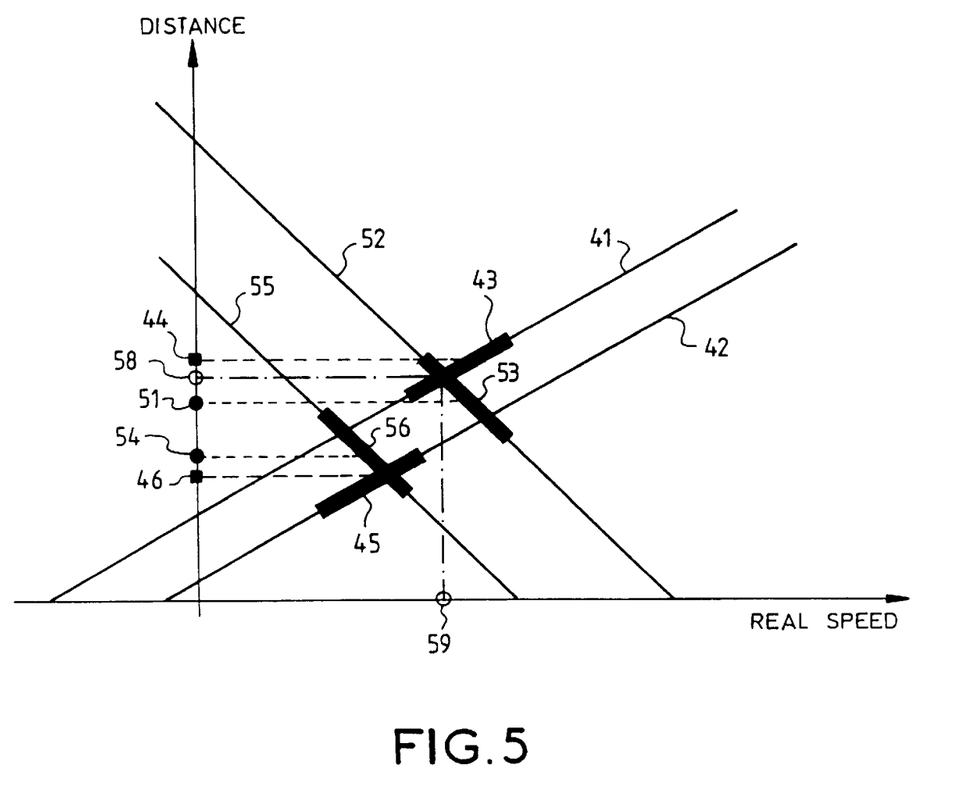
FIG. 5 exemplifies a possible improvement of the precision of the method according to the invention.

According to the invention, an improvement in the precision of measurement, especially when the signal-to-noise ratio is small, is obtained by sending out a sequence of double upward modulation ramps switched over alternately and spaced out by $\Delta F$, and then a sequence of double downward modulation ramps switched over alternately and spaced out by the same frequency variation $\Delta F$. The distance pre-estimation enables the selection, for each direction of the ramps, of reduced zones on each ambiguity straight line, selected for example for distances equal to the distance measured by the differential phase within a range of $\pm 2\sigma$, where $\sigma$ represents for example the error with regard to the distance. The real distances and velocities are then obtained by searching for the intersections of the preselected zones. This improvement is applicable only if the intersections of the zones are not ambiguous. FIG. 5 illustrates this improvement in the Distance-Speed plane of FIG. 4 with the same targets brought in play. As seen here above for the first target, a first pre-estimation of distance 44, obtained from a sequence of double upward ramps and then associated with an ambiguity straight line 41, makes it possible to deduce the real speed of the target except for an uncertainty 43. The improvement is obtained by determining a second pre-estimated distance 51 equal to the first pre-estimated distance 44 within a range of $\pm 2\sigma$. With the target there is associated a downward ambiguity straight line 52 and on this straight line there is an uncertainty zone 53. The intersection of the two uncertainty zones 43, 53, in fact of the two selected zones, gives the distance 58 and the speed 59 that are being sought. For the second target, the intersection of two reduced zones 45, 56 on the ambiguity straight lines 42, 55 corresponding to the upward and downward ramps and obtained from the estimated distances 46, 54 for these same ramps also gives the desired coordinates.

Figure 6A:
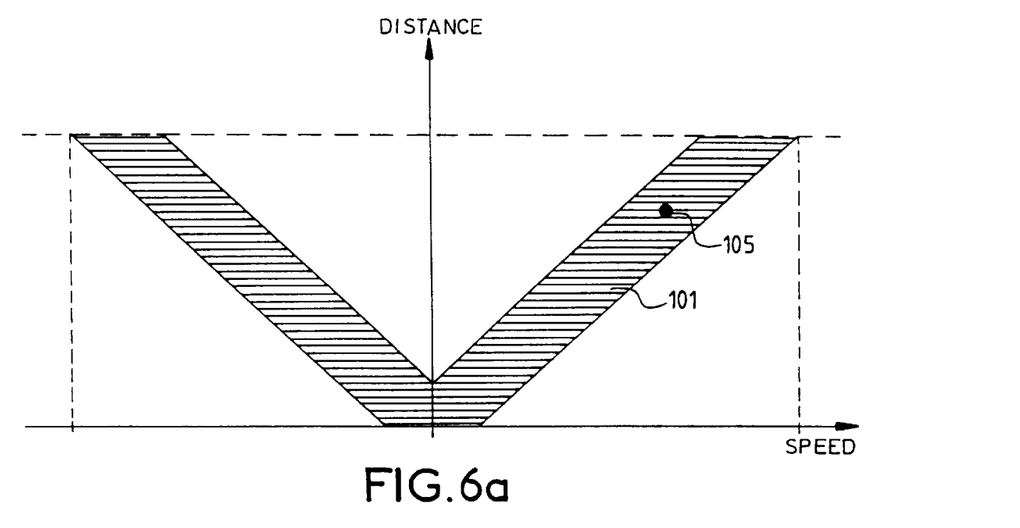
FIGS. 6a and 6b respectively illustrate domains of operation of a radar working according to the prior art and a radar working according to the invention.
Figure 6B:
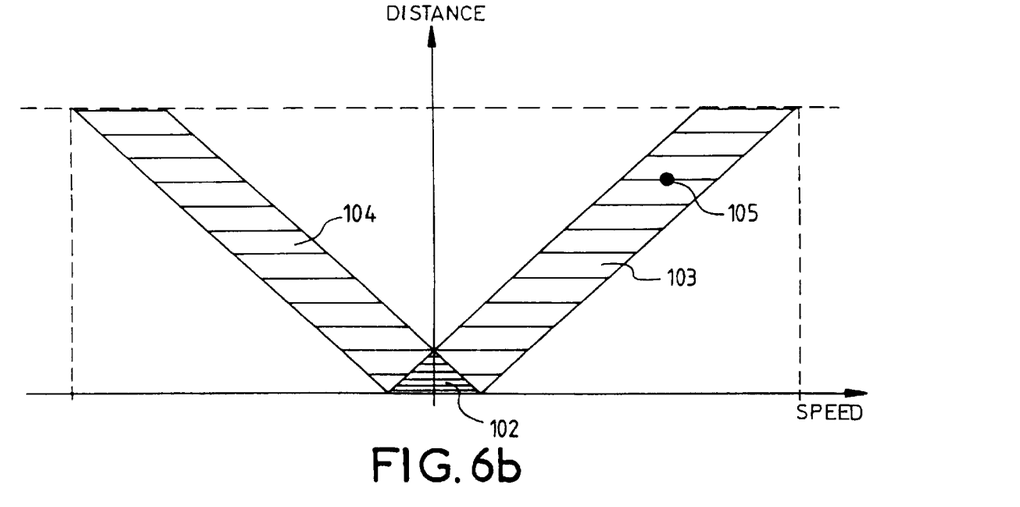

The removal of ambiguity according to the invention between the distance and the speed may work on several ramps of different slopes. By using at least two groups of ramps, for example with opposite slopes, and by basing the extraction of the distance on either of the elementary detection values obtained at the end of the two groups of ramps, it is possible to increase the domain of application of the method according to the invention in the Distance-Speed plane by reducing the blind zone. The distance from the target is actually obtained by an "or" type logic relationship between the elementary detection values. It is possible for example to extract the distance on the basis alternately of one group or the other. FIGS. 6a and 6b illustrate this advantage of the invention. FIG. 6a gives a view, in the Distance-Speed plane, of the blind zone of a radar with ambiguity removal according to the prior art, in the optimum case. This zone 101 represents a band located around ambiguity straight lines corresponding to beat frequencies located around zero. FIG. 6b shows that the blind zone 102 of a radar according to the invention is limited to the intersection of two bands 103, 104 located around ambiguity straight lines corresponding to frequencies close to zero. Each band corresponds to a group of ramps. Thus, by extracting the distance on the basis for example alternately of one of the two groups of ramps, a target 105 located in the blind zone of a prior art radar, outside the intersection of the two bands 103, 104 mentioned here above, may be detected at least once every two times with a radar according to the invention. Those targets that undergo double detection are, for example, processed according to the improvement pertaining to FIG. 5, the targets detected in a single group of ramps being for example localized according to the method pertaining to FIG. 4.

The method according to the invention may be extended to the use of N switched frequency modulation ramps slightly offset in frequency with respect to one another. Two composite signals are formed by two distinct linear combinations of the received signals associated with the N ramps after, for example, compensation for the delays due to the non-simultaneity of the ramps. The pre-estimation of distance is deduced from the measurement of differential phase between the two composite signals. Should N=4, a first composite signal may for example be obtained by deducting the first received signal S1 from the second received signal S2, i.e. S2−S1 and a second composite signal may for example be obtained by deducting the third received signal S3 from the fourth received signal S4. All combinations making it possible for example to synthesize given transfer functions can be envisaged. In any case, according to the invention, the number of switched ramps is not limited to two.

Figure 7:
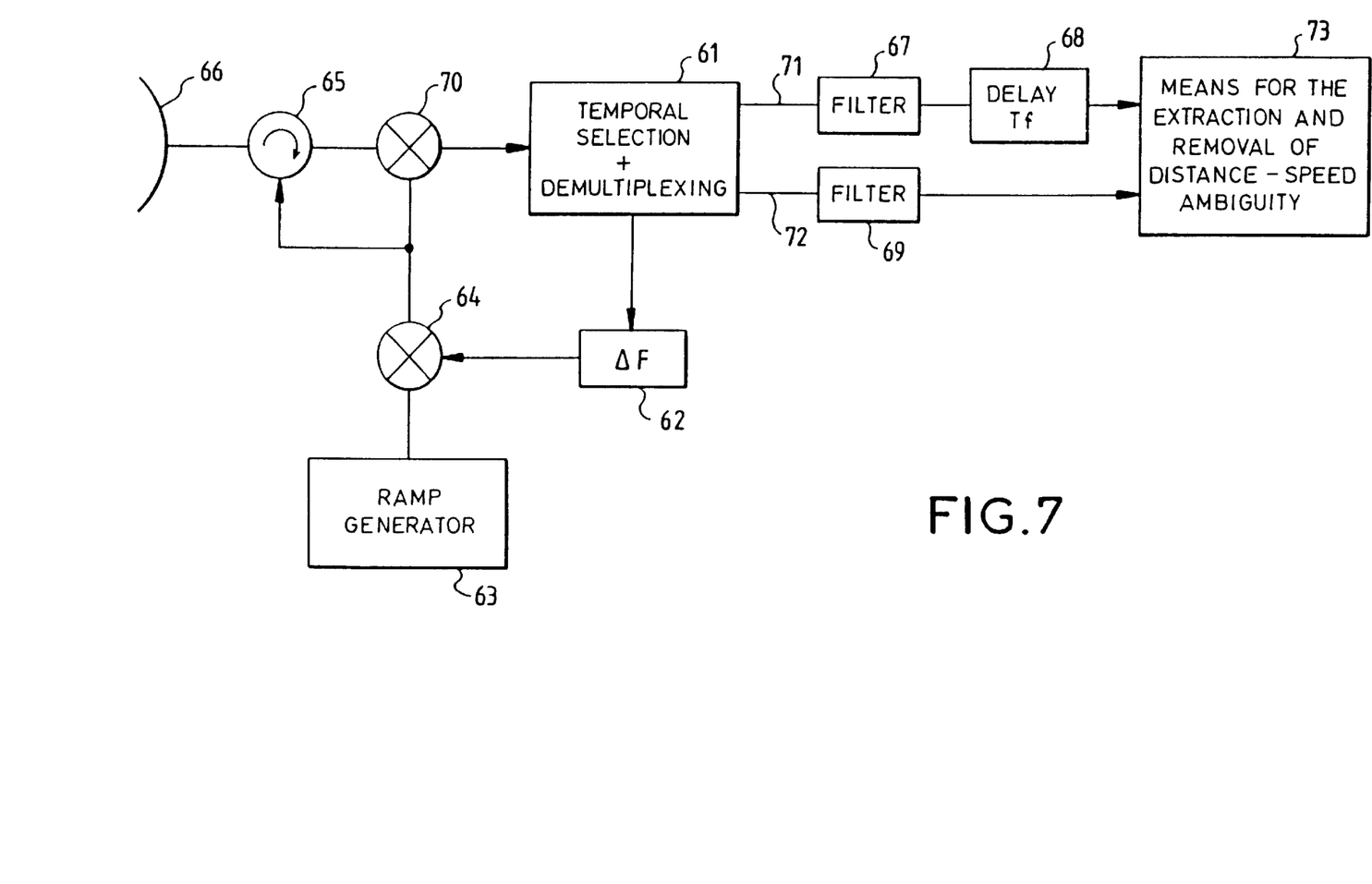
FIG. 7 shows a possible embodiment of a device for the implementation of the method according to the invention.

FIG. 7 illustrates a possible embodiment of a device to implement the method according to the invention. Temporal selection and demultiplexing means 61 control for example a frequency generator 62 delivering the above-mentioned frequency ΔF and a zero frequency alternately during the above-mentioned period Tf. The frequency delivered is added to the frequency given by a frequency ramp generator 63 through a first mixer 64 so as to alternately offset the frequency ramp by ΔF in accordance with FIG. 3. The switched double ramp is sent out via a microwave circulator 65, amplification means (not shown) and an antenna 66 to potential targets. Reception means (not shown) are for example connected to the input/output of the circulator. The signals are received through the circulator 65 and a second mixer 70. One input of this second mixer 70 is connected to the circulator while its other input is connected to the output of the first mixer, the output of the second mixer being connected to the input of the temporal selection and demultiplexing means 61. The temporal selection and demultiplexing means 61 route the received signal alternately to the two channels in such a way that the signal received coming from the first ramp is applied to a first channel 71 and the signal received coming from the second ramp offset by ΔF is applied to the second channel 72. Filters 67, 69 are for example positioned in each channel 71, 72. The signal present in the first channel is delayed by Tf to take account especially of the non-simultaneity of the transmission of the two ramps. Indeed, at a given instant of sampling, a received signal corresponds only to one ramp. To obtain a simultaneous sampling of the two signals corresponding to the two ramps, it is necessary to delay one of the two signals, in particular by the ramp switching period Tf. To this end, Tf delay means 68 are for example placed at output of the filter 67. Another approach may consist for example in memorizing one of the two signals in the temporal selection and multiplexing means 61.

The signals received on the two channels are taken into account by means 73 for extraction and removal of ambiguity between distance and speed. These means 73 determine the differential phase Δϕ between the signals received on each channel, and compute the pre-estimated distance according to the relationship (20). Since the equations of the ambiguity straight lines are for example memorized in these means 73, these means may deduce the velocities of the targets either according to the operations illustrated in FIG. 4 or according to those illustrated in FIG. 5. In the latter case, the ramp generator 63 is controlled for example to give different ramps, especially with opposite slopes. The means 71 for extraction and removal of ambiguity between the distance and speed comprise for example interfaces, processors and memories used furthermore in radar processing and therefore not requiring any additional circuit. The device according to the invention illustrated by way of an example in FIG. 6 shows in particular that this device is simple to implement and is economical, especially as it requires no complex components or structures. This is particularly important for automobile applications.

What is claimed is:

1. A method of frequency-modulated continuous-wave radar detection with removal of ambiguity between the distance and the speed, wherein the radar sends out at least alternately two parallel and discontinuous frequency modulation ramps that are slightly offset by a frequency variation (ΔF), the frequency being switched from one ramp to the other at the end of a given duration (Tf), the distance from a detected target being estimated as a function of the difference in phase (Δϕ) between a received signal ($S_1(t)$) corresponding to the first ramp and a received signal ($S_2(t)$) corresponding to the second ramp, the speed of the target being obtained from the estimated distance and the ambiguity straight line associated with the target.

2. A method according to claim 1, wherein the estimated distance D is given by the following relationship:

$$D = \frac{\Delta\varphi}{4\pi} \times \frac{C}{\left(\Delta F + B\frac{Tf}{T}\right)}$$

C representing the velocity of light;
B representing the modulation frequency band;
T representing the ramp repetition period;
ΔF representing the frequency variation between the ramps;
Tf representing the duration at the end of which the frequency is switched from one ramp to the other;
Δϕ representing the measurement of the difference in phases between the received signals corresponding to the two ramps separated by ΔF.

3. A method according to claim 1, wherein a sequence of double, alternately switched upward modulation ramps and a sequence of double, alternately switched downward modulation ramps are transmitted and spaced out by the same frequency variation (ΔF), limited zones on each ambiguity straight line being selected for each direction of slopes around the estimated distance, the distance and the speed being determined in the Distance-Speed plane by the intersection of the selected zones of the ambiguity straight line corresponding to the upward ramp and the ambiguity straight line corresponding to the downward ramp.

4. A method according to claim 1 wherein, with the radar sending out a given number N of switched frequency modulation ramps offset in frequency with respect to one another, two composite signals are formed by distinct linear combinations of the received signals associated with the N ramps, the distance estimation being deduced from the difference in phase between the two composite signals.

5. A method according to claim 1, wherein two groups of frequency ramps with opposite slopes are transmitted, the distance from the target being obtained by an "or" type logic relationship between the elementary detection values obtained at the end of the two groups.

6. A device for the implementation of the method according to claim 1, comprising at least:
a frequency ramp generator;
a first mixer having one input connected to the ramp generator and its other input connected to the output of a frequency generator delivering the frequency variation (ΔF) and a zero frequency alternately, each during a given duration (Tf) so that the output of the mixer delivers a switched double ramp;
a second mixer having one input connected to the output of the first mixer, its other input receiving the reception signal;

temporal selection and demultiplexing means whose input is connected to the output of the second mixer, routing the received signal alternately to the two channels in such a way that the received signal coming from the first ramp is applied to the first channel and the received signal coming from the second ramp offset by the frequency variation ($\Delta F$) is applied to the second channel means for the extraction and removal of ambiguity between distance and speed, these means determining the differential phase ($\Delta\phi$) between the signals received on each channel to compute the distance and the speed of the detected target corresponding to the received signal.

7. A device according to claim 6, wherein the first channel comprises means to delay the received signal.

8. A device according to claim 6, wherein the channels comprise filters.

9. A device according to claim 1, comprising a circulator that has one input connected to the output of the first mixer, one output connected to an input of the second mixer and its other input/output connected to transmission and reception means.

* * * * *